(12) United States Patent
Wang et al.

(10) Patent No.: US 11,784,322 B2
(45) Date of Patent: Oct. 10, 2023

(54) METAL SEAWATER FUEL CELL

(71) Applicant: DALIAN INSTITUTE OF CHEMICAL PHYSICS, CHINESE ACADEMY OF SCIENCES, Liaoning (CN)

(72) Inventors: Erdong Wang, Liaoning (CN); Min Liu, Liaoning (CN); Zhao Yan, Liaoning (CN); Gongquan Sun, Liaoning (CN)

(73) Assignee: Dalian Institute of Chemical Physics, Chinese Academy of Sciences, Liaoning (CN)

( * ) Notice: Subject to any disclaimer, the term of this patent is extended or adjusted under 35 U.S.C. 154(b) by 166 days.

(21) Appl. No.: 17/413,899

(22) PCT Filed: Dec. 17, 2018

(86) PCT No.: PCT/CN2018/121487
§ 371 (c)(1),
(2) Date: Jun. 14, 2021

(87) PCT Pub. No.: WO2020/118735
PCT Pub. Date: Jun. 18, 2020

(65) Prior Publication Data
US 2022/0059851 A1 Feb. 24, 2022

(30) Foreign Application Priority Data

Dec. 14, 2018 (CN) .......................... 201811531830.1
Dec. 14, 2018 (CN) .......................... 201811531837.3

(51) Int. Cl.
*H01M 6/34* (2006.01)

(52) U.S. Cl.
CPC .................................... *H01M 6/34* (2013.01)

(58) Field of Classification Search
CPC ........ H01M 4/466; H01M 6/34; H01M 6/425; H01M 6/5088
See application file for complete search history.

(56) References Cited

U.S. PATENT DOCUMENTS

| 2013/0108935 A1* | 5/2013 | Dornajafi | ................ | H01M 6/32 |
| | | | | 977/734 |
| 2021/0075078 A1* | 3/2021 | Miller | ................ | H01M 50/103 |

FOREIGN PATENT DOCUMENTS

| CN | 101313426 A | 11/2008 |
| CN | 103165961 A | 6/2013 |

(Continued)

*Primary Examiner* — Matthew T Martin
*Assistant Examiner* — Ankith R Sripathi
(74) *Attorney, Agent, or Firm* — NKL Law; Allen Xue (57) ABSTRACT

A metal seawater fuel cell includes a single cell or a battery pack which is composed of more than two single cells connected in series or in parallel or in series and parallel through circuits. The single cell has a metal anode arranged oppositely in a sealed single cell housing, a cathode carrying a hydrogen evolution catalyst, and a diaphragm arranged between the metal anode and the cathode, the bottom and the top of the single cell housing are respectively provided with fluid flow channels, and both ends of the fluid flow channels are respectively provided with openings communicated with the interior and exterior of the housing. The metal anode and/or single cell housing is placed in a closed transitional housing. The transitional housing is a degradable material or can be mechanically damaged by a driving device driven and started by a control device.

24 Claims, 7 Drawing Sheets

(56) References Cited

FOREIGN PATENT DOCUMENTS

| | | |
|---|---|---|
| CN | 204407417 U | 6/2015 |
| CN | 105591178 A | 5/2016 |
| CN | 106898844 A | 6/2017 |
| CN | 108183245 A | 6/2018 |

* cited by examiner

METAL SEAWATER FUEL CELL

TECHNICAL FIELD

The present invention relates to a metal seawater fuel cell, and particularly to a metal seawater fuel cell which can be stored and used in a marine environment for a long time.

BACKGROUND

Under the background of construction of a powerful maritime nation, the exploration and development of deep sea—and far sea—has become a research hotspot in the marine field. Energy is a key component that determines the working depth and working time of marine equipment. Under deep sea conditions, conventional primary batteries (alkaline manganese batteries and lithium primary batteries) and secondary batteries (such as lead-acid batteries, silver-zinc batteries and lithium ion batteries) are difficult to meet the requirements of novel underwater equipment for power supplies with large capacity, long service life, safety, reliability and good marine environment adaptability. The performance of the frequently-used magnesium dissolved oxygen seawater battery is greatly affected by the dissolved oxygen concentration in the seawater. When the dissolved oxygen concentration in the seawater is decreased, the battery performance is rapidly reduced and is difficult to meet the normal power supply requirements of marine equipment. A magnesium water battery that uses metal or alloy such as metallic magnesium as an anode, porous material that supports a hydrogen evolution catalyst as a cathode, and the water as cathode fuel overcomes the dependence of the traditional magnesium dissolved oxygen seawater battery on the oxygen concentration in the seawater, and thus has wide application prospects for its advantages of high stability, compact structure and small volume. The magnesium water battery is suitable for long-term continuous power supply in the full ocean depth.

In order to maintain the long-term continuous power supply in the marine environment, it is necessary to increase the mass of anode fuel. However, under the wet storage conditions of the marine environment, the metal anode causes massive energy loss due to self-corrosion. If the anode fuel is replaced frequently, it is difficult to be achieved in the deep sea environment and the use cost is increased.

SUMMARY

Aiming at the defects in the prior art, the present invention proposes a novel metal seawater fuel cell system with controllable storage in a marine environment and on-demand startup.

A metal seawater fuel cell comprises a single cell or a battery pack which is composed of more than two single cells connected in series or in parallel or in series and parallel through circuits;

the single cell comprises a metal anode arranged oppositely in a sealed single cell housing, a cathode carrying a hydrogen evolution catalyst, and a diaphragm arranged between the metal anode and the cathode, the bottom and the top of the single cell housing are respectively provided with fluid flow channels, and both ends of the fluid flow channels are respectively provided with openings communicated with the interior and exterior of the housing;

in the metal seawater fuel cell, at least one metal anode and/or at least one single cell housing is placed in a closed transitional housing;

the transitional housing is a degradable material or can be mechanically damaged by a driving device driven and started by a control device.

The transitional housing is mechanically damaged by the driving device driven and started by the control device, and specifically: the driving device is connected with the transitional housing through a transmission device to control mutual peeling between the transitional housing and the metal anode or the single cell housing, or is connected with a transitional housing cutting device through the transmission device to control the damage to the transitional housing by the transitional housing cutting device.

The transitional housing is made of thin layer material or elastic material.

When the driving device is driven and started by the control device, the driving device is a motor; the transmission device is in transmission connection with the driving device;

the transmission device is composed of one or more than one of a rolling screw, or a gear driven drum, or a rope, or a hydraulic cylinder, or a connecting rod mechanism connected in series;

the transitional housing cutting device is a sharp-edged cutter abutted against the transitional housing;

the control device is in signal connection with the driving device.

The control device is a timing control device comprising a clock chip and an auxiliary drive circuit, or a mechanical change control device comprising a force sensing element and a driving circuit, or a capacity control device comprising a voltage and current test element and a driving circuit, or a power change control device comprising a voltage and current test element and a driving circuit, or a battery pack failure control device comprising a voltage and current test element and a driving circuit.

The timing control device can set the time in advance, and after the set time is reached, the driving circuit controls the operation of the driving device;

the force change control device can monitor the gravity/buoyancy change of the metal seawater fuel cell in a discharge process, and after judging that discharge cut-off is reached, the driving circuit controls the operation of the driving device;

the capacity control device can monitor the actual discharge capacity of the battery pack, and when the rated capacity of the battery pack is reached, the driving circuit controls the operation of the driving device;

the power change control device can monitor the actual discharge power change, and when the power exceeds the rated power of one battery pack, the driving circuit controls the operation of the driving device;

the battery pack failure control device can monitor the voltage and current changes in the discharge process of the battery pack, and when the battery pack fails, the driving circuit controls the operation of the driving device.

The cutting device comprises a cutter arranged on the transmission device, and translates, rotates or flips along with the transmission device to drive the sharp-edged cutter to damage the transitional housing;

after the driving device is started, the single cell is activated to realize the external discharge of the single cell; or a certain single cell in the battery pack or more than two single cells connected in series or in parallel or in series and parallel are activated to realize the rated external discharge of the battery pack.

The transitional housing is made of a thin layer material with an internal spiral spring, or elastic rubber, or elastic plastic, or waterproof cloth;

when the thin layer material with the internal spring is used, after the transitional housing is punctured or scratched and a force point at one end of the spring is destroyed, the transitional housing is peeled off from the exterior of the metal anode or the single cell due to spring return;

when the elastic material is used, after the transitional housing is punctured or scratched, the elastic material is peeled off from the exterior of the metal anode or the single cell due to the effect of elastic force.

When the waterproof cloth is used, the opening at one end wraps the surface of the anode or the single cell; the end is bound and sealed with a slipknot; the slipknot is connected with the transmission device and moves along with the transmission device so that the slipknot is opened to peel off the waterproof cloth from the surface of the metal anode or the single cell.

When the metal anode or the single cell housing is wrapped, the transitional housing is fixed outside the metal anode or the single cell housing by one or more than one of injection molding, bundling, bonding or welding.

Detachable plugs or valves are arranged at the openings of the fluid flow channels communicated with the exterior.

The driving device is connected with the detachable plugs or valves through the transmission device, and controls the detachment of the detachable plugs at the openings of the fluid flow channels or the opening of the valves.

The detachable plugs are arranged in the fluid flow channels at the bottom and the top of the single cell housing, moves with the transmission device and separates from the fluid flow channels at the bottom and the top of the single cell housing.

The driving device is a structural driving starting device.

The structural driving starting device is composed of a lever adjusting displacement mechanism and a cutting device; when a single cell reacts completely, the weight change of the single cell drives the displacement mechanism to generate displacement, then drives the cutting device, destroys the transitional housing, and activates the other one or more single cells in the battery pack.

The metal seawater fuel cell is an open structure with a product storage cavity at the bottom, that is, the reaction product slides down along an inclined plane under the action of a component force generated on the inclined plane by gravity in the deposition process. A product discharge hole is arranged at the bottom of the fixed cavity, and the product is accumulated, slides down and is discharged from the single cell through the product discharge hole. An angle between the inclined plane and the horizontal plane arranged on the inner wall surfaces of the fixed cavity, a telescopic cavity and a soft bag is greater than 14° and less than 90°.

The cell system is put into the ocean; through control timing or mechanism displacement, the start of a magnesium seawater fuel cell is controlled at definite time to prolong the deep sea storage time of the magnesium seawater fuel cell, avoid the self-corrosion influence and obviously increase the specific energy of the cell.

When the control device is a mechanical change control device with a force sensing element and a driving circuit, the single cell is an open structure with a product storage cavity at the bottom, that is, a reaction product is discharged from the single cell through a provided product discharge hole under the action of gravity in a deposition process.

The degradable material is made of a seawater-degradable material and/or a biodegradable material; the degradation cycle of the degradable material can be controlled by adjusting the thickness and/or composition of the material.

The seawater-degradable material is prepared by mixing aliphatic polyester, a hydrolysis inhibitor and/or a hydrolysis accelerator, and an auxiliary agent;

the biodegradable material is completely biodegradable plastic and/or destructive biodegradable plastic.

The destructive biodegradable plastic is one or more than one of starch-modified or filled polyethylene PE, polypropylene PP, polyvinyl chloride PVC and polystyrene PS;

the fully biodegradable plastic is one or more than one of thermoplastic starch plastic, aliphatic polyester, polylactic acid, and starch/polyvinyl alcohol.

In the closed single cell housing, two metal anodes are arranged on two opposite sides of the cathode carrying the hydrogen evolution catalyst; an acidic material or an alkaline material sealed and wrapped by a water-soluble film and/or a film of a seawater-degradable material is arranged in one of the metal anodes; the other metal anode is wrapped by a to-be-degraded housing (as the transitional housing) corresponding to the sealed and wrapped acidic material or alkaline material; the acidic material or the alkaline material wrapped by the water-soluble film or the film of the seawater-degradable material is sealed and stored in the transitional housing of one of the metal anodes; after the metal anode reacts completely, the water-soluble film may be dissolved by the film of the seawater-degradable material, and the built-in acidic material or alkaline material is dissolved in seawater to form an acidic or alkaline solution locally in the single cell housing;

the to-be-degraded housing of the other metal anode can react with the acidic or alkaline solution, so that the other metal anode is exposed to the seawater to react.

The material of the to-be-degraded housing which can react with the acidic solution is one or more than one of aluminum hydroxide, zinc hydroxide, calcium hydroxide, magnesium hydroxide, iron hydroxide, calcium oxide, magnesium oxide, zinc oxide, aluminum oxide, ferric oxide and nickel oxide;

the acidic material is a solid acid which is one or a mixture of more than one of silicic acid, trichloroacetic acid, periodic acid, dinitrobenzoic acid and ethylenediaminetetraacetic acid;

the material of the to-be-degraded housing which can react with the alkaline solution is one or more than one of calcium carbonate, barium carbonate, silver carbonate, zinc oxide and aluminum oxide;

the alkaline material is a solid base which is one or a mixture of more than one of sodium hydroxide, potassium hydroxide and lithium hydroxide.

The water-soluble film is a natural water-soluble polymer or a chemically modified natural polymer or a synthetic polymer.

The natural water-soluble polymer is one or more than one of starch, cellulose, vegetable glue and animal glue;

the chemically modified natural polymer is one or more than one of carboxymethyl starch, acetate starch, hydroxymethyl cellulose and carboxymethyl cellulose;

the synthetic polymer is one or more than one of polyacrylamide (PAM), hydrolyzed polyacrylamide (HPAM) and polyvinylpyrrolidone (PVP).

The metal seawater fuel single cell is an open structure with the product storage cavity at the bottom; the product discharge hole is arranged at the bottom of the product storage cavity, and the product is accumulated, slides down and is discharged from the single cell through the product discharge hole.

When the metal seawater cell comprises more than two single cells connected in series or in parallel or in series and parallel, and when the bottoms of the product storage cavities of the single cells are product discharge holes, short-circuit flow channels are arranged among the single cells. A length-to-diameter ratio of the flow channels is greater than 1.

The arrangement of the flow channels makes the maximum short-circuit current of the metal seawater cell less than 1% of operating current.

The material of the single cell housing is one or more than one of ABS plastic, polyvinyl chloride PVC, high-density polyethylene HDPE, polypropylene PP, polystyrene/modified polystyrene PS, polyoxymethylene POM, polyphenylene oxide PPO, polyimide PI, polyphenylene sulfide PPS, ethylene PE, nylon PA and polysulfone PSF.

The cell system is put into the ocean; through control timing or mechanism displacement, the start of a magnesium seawater fuel cell is controlled at definite time to prolong the deep sea storage time of the magnesium seawater fuel cell, avoid the self-corrosion influence and obviously increase the specific energy of the cell.

The anode of the metal seawater fuel cell is magnesium metal or magnesium alloy.

The diaphragm is a polymer non-woven porous membrane material, and the pore diameter of the diaphragm is less than or equal to 0.1 um.

The diaphragm is one of a polyethylene film, a polypropylene film, a polyvinyl alcohol film, a Nafion film and a hydrophilic PTFE film.

The active components of the hydrogen evolution catalyst are one or more than one of transition metal sulfide, transition metal phosphide, transition metal phosphide, transition metal, and alloy of more than one transition metal; the adopted carrier which carries the hydrogen evolution catalyst is one of foamed nickel, a nickel net and a carbon fiber felt. The mass loading of the active components on the catalyst is 5%-40%.

Compared with the prior art, the metal seawater fuel cell of the present invention has the following advantages:
(1) The metal seawater fuel cell system can realize long-term storage in a marine environment through the transitional housing or detachable plugs and valves.
(2) The cell has simple structure, and can realize long-term storage in the marine environment by only adding one anode transitional housing. The cell can be activated and used within a controllable cycle.
(3) The metal seawater fuel cell system is activated under specific conditions through the control device, which obviously improves the reliability and the long-term use feasibility of the metal seawater fuel cell.

1—cathode; 2—diaphragm; 3—metal anode; 4—single cell housing; 5—product storage cavity; 6—transitional housing; 7—single cell; 8—system frame; 9—control device; 10—driving device; 11—transmission device; 12—cutting device; 13—connecting rod mechanism; 14—plug; 15—single cell B; 16—single cell A; 17—water-soluble film; 18—solid acid or solid base; 19—single cell C; 20—single cell D.

DETAILED DESCRIPTION

Embodiment 1

Figure 1:
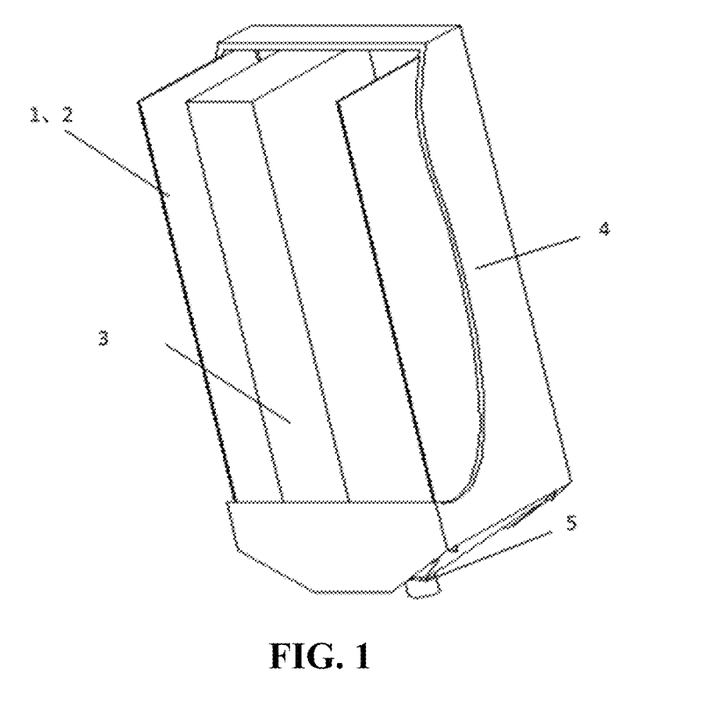
FIG. 1 is a structural schematic diagram of a single cell of a metal seawater fuel cell.
Figure 2:
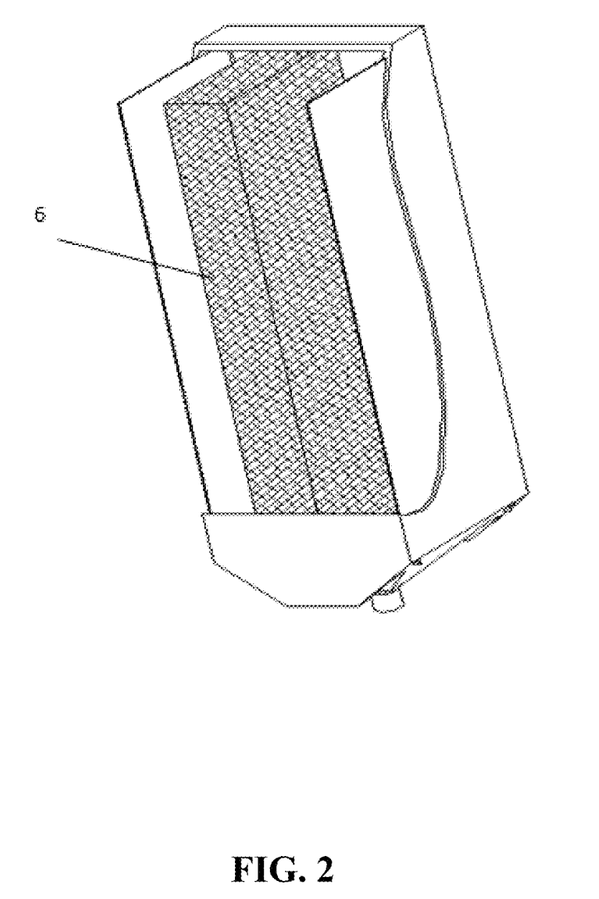
FIG. 2 is a schematic diagram of an anode transitional housing of a metal seawater fuel cell.
Figure 3:
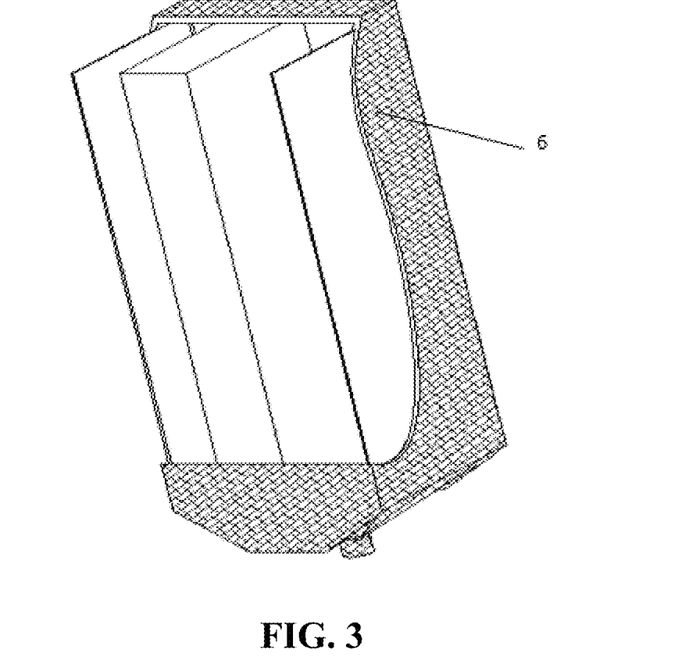
FIG. 3 is a schematic diagram of a cathode transitional housing of a metal seawater fuel cell.
Figure 4:
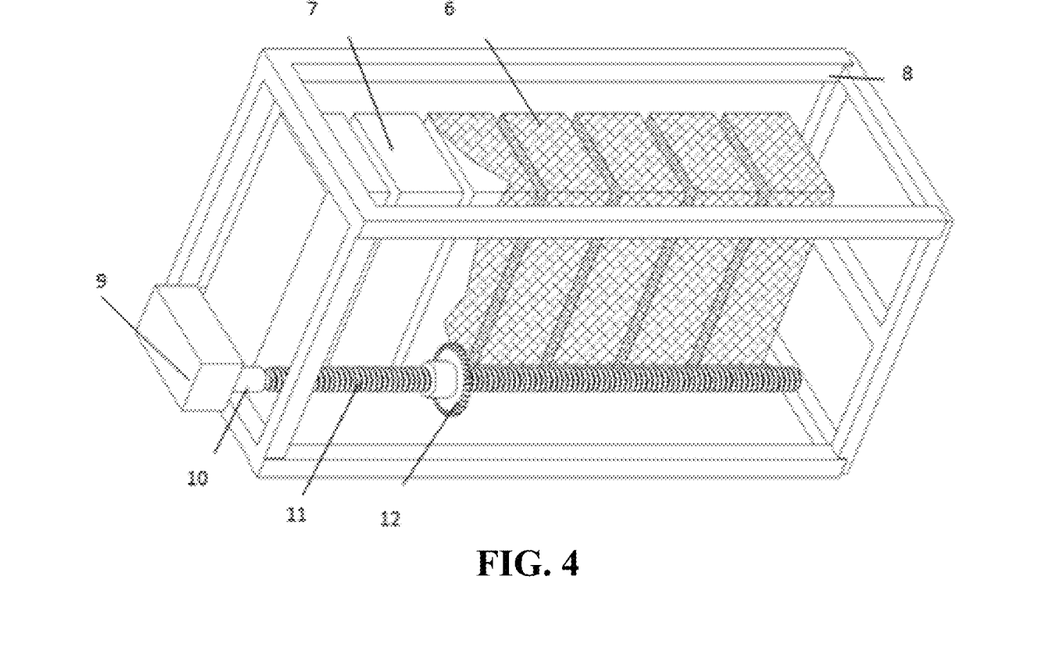
FIG. 4 is a schematic diagram of composition of a metal seawater fuel cell system.

As shown in FIG. 4, the single cell is composed of five parts: a cathode, a diaphragm, an anode, a diaphragm, and a cathode. The structure shown in FIG. 3 is adopted. The surface of the single cell is wrapped with a transitional housing made of elastic material. The anode part is magnesium alloy; the electrode size is 300 mm*200 mm*20 mm; the foamed nickel is used as the cathodes; the cathode size is 300 mm*200 mm*5 mm; an electrolyte is 3.5% sodium chloride aqueous solution; a distance between the anode and the cathodes is 20 mm; and the diaphragms are polypropylene films arranged between the cathodes and the anode.

Figure 6:
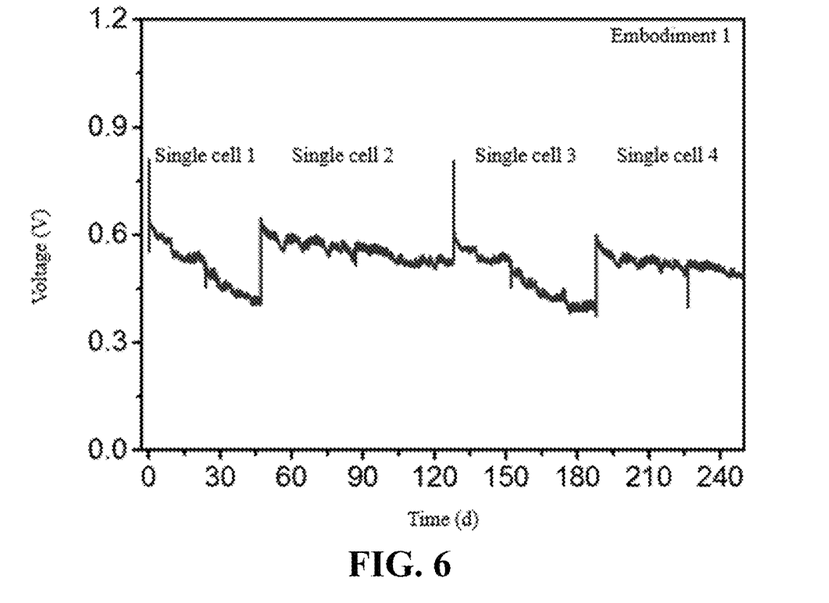
FIG. 6 is a discharge voltage curve of a single cell in embodiment 1.

The metal seawater fuel cell system comprises a battery pack composed of 8 single cells with the above structure which are connected in series and relatively parallel. A transmission device is arranged, which is a rolling screw inside the system housing on one side of the battery pack perpendicular to the electrodes of the single cells. A rotating blade that rotates with the rolling screw is arranged on the rolling screw, and the rotating blade is attached to the transitional housings wrapped on the outer surfaces of the single cells. One end of the rolling screw is provided with a motor driving device connected with a control device. The control device 9 is composed of a time relay and a driving circuit. The driving device is a motor, the transmission device is the rolling screw, and the cutting device is the rotating blade. The motor is controlled at different time intervals (45 days, 90 days and the like) to act, and then the rolling screw and the rotating blade on the rolling screw are controlled to act. The transitional housings on the surfaces of the single cells are scratched in sequence to realize the timing starting of the single cells. The voltage changes in the battery discharge process are recorded, as shown in FIG. 6. The fuel cell realizes the long-term storage of a plurality of single pools and timing starting.

Embodiment 2

Figure 5:
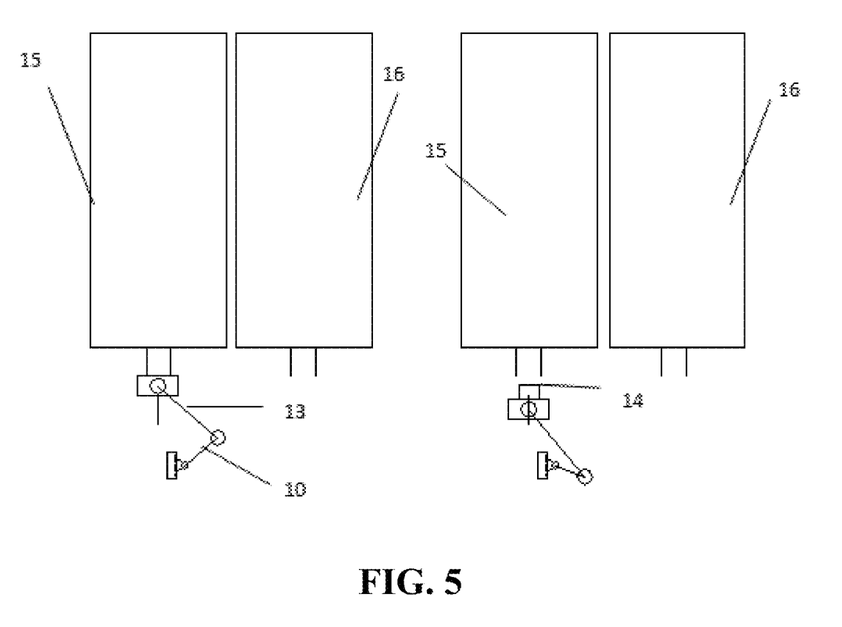
FIG. 5 is a structural schematic diagram when a transmission device is a connecting rod structure, and the right figure is a structural schematic diagram without a plug.
Figure 7:
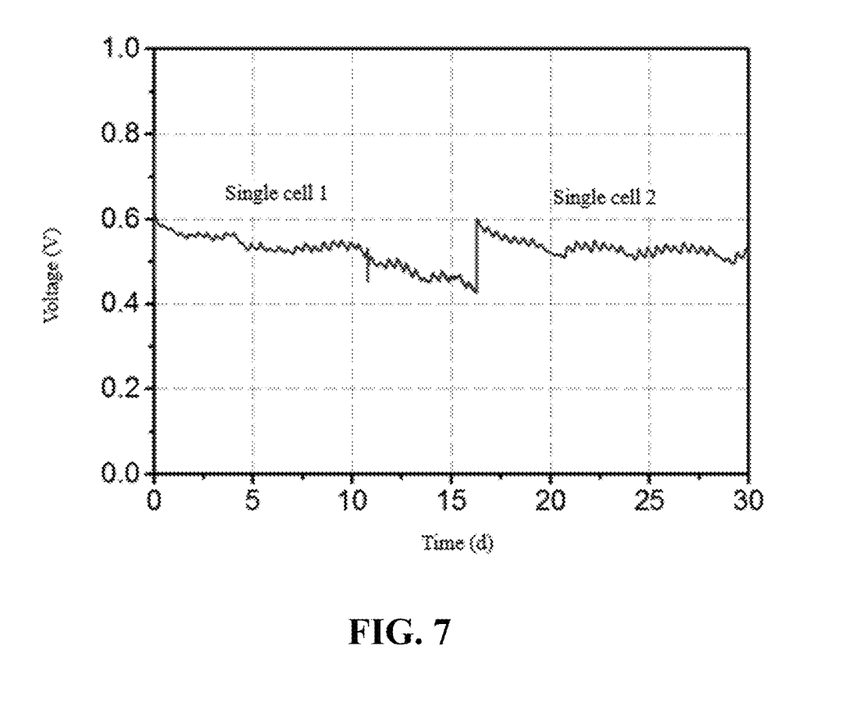
FIG. 7 is a discharge voltage curve of a single cell in embodiment 2.

As shown in FIG. 5, the battery pack comprises a single cell A and a single cell B connected in series. The single cell is composed of a cathode, a diaphragm and an anode. AZ91 magnesium alloy is used as the anode; the electrode size is 200 mm*200 mm*15 mm; foamed nickel is used as the cathode; the size of the cathode is 200 mm*200 mm*2 mm; a distance between the anode and the cathode is 3 mm; the diaphragm is a polypropylene film arranged between the cathode and the anode; and the electrolyte is 3.5% sodium chloride aqueous solution. A rubber plug is arranged in a flow channel of the single cell B. In the metal seawater fuel cell system, the control device and the driving device are arranged outside the battery pack. The control device is electrically connected with the driving device, and the transmission device is mechanically connected with the driving device. The control device is a capacity controller, the driving device is a motor, and the single cell A is discharged at constant current of 0.5 mA/cm$^2$. When the capacity of the single cell A reaches a set value of 15 Ah, the driving circuit of the control device drives the motor to rotate. The transmission device is a connecting rod mechanism. The motor rotates to drive a crank slider to move to remove the plug in the flow channel of single cell B to realize the liquid injection discharge of the single cell. The discharge voltage curve of the single cell is recorded, as shown in FIG. 7.

Embodiment 3

Figure 8:
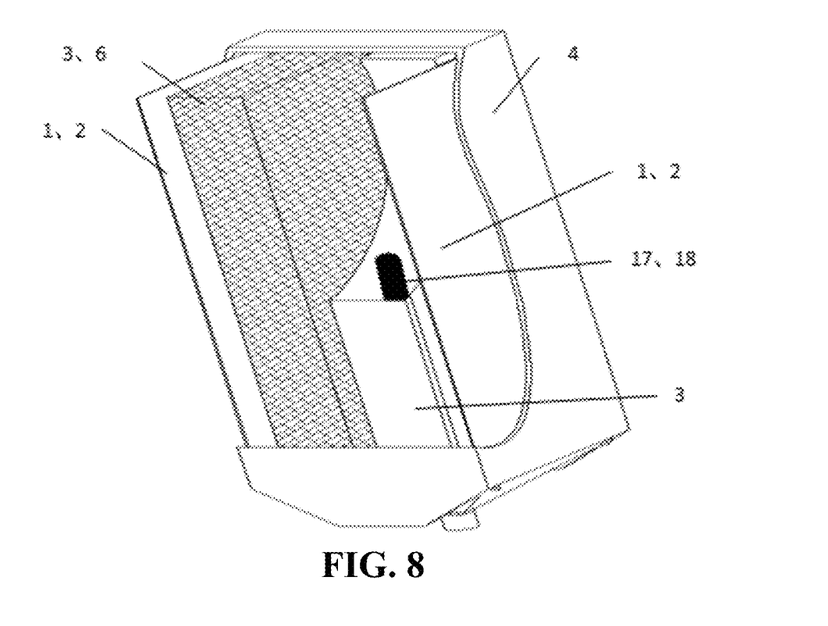
FIG. 8 is a structural schematic diagram of a single cell of another metal seawater fuel cell.
Figure 10:
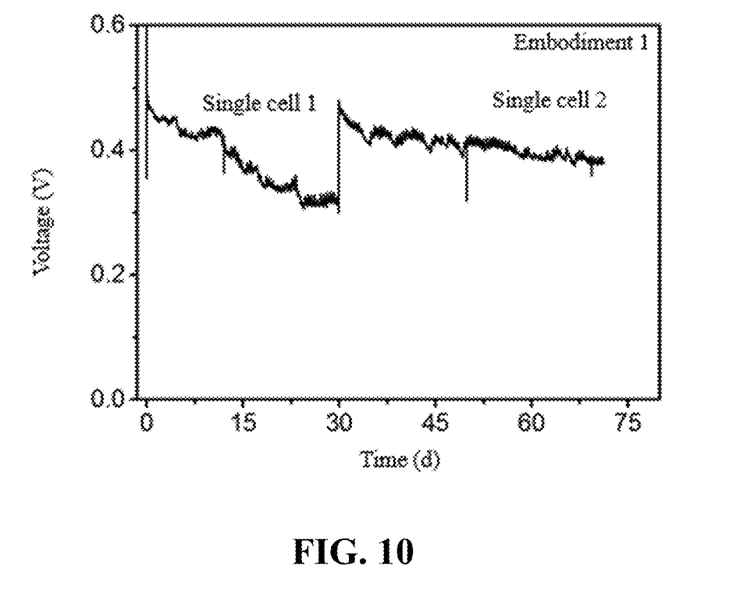
FIG. 10 is a discharge voltage curve of a single cell in embodiment 3.

As shown in FIG. 8, the single cell comprises a cathode, a diaphragm, an anode A with a transitional housing (to-be-degraded housing), an anode B, a diaphragm and a cathode. AZ91 magnesium alloy is used as the anodes; the electrode size is 20 mm*20 mm*20 mm; foamed nickel is used as the cathodes; the cathode size is 20 mm*20 mm*2 mm; a distance between the anodes and the cathodes is 10 mm; the diaphragms are polypropylene films arranged between the cathodes and the anodes; a transitional housing A made of zinc oxide is arranged on the surface of the anode A; a water-soluble polyacrylamide film is placed in the middle in the single cell B, and wrapped with solid acidic material of trichloroacetic acid; and the electrolyte used in the single cell reaction is 3.5% sodium chloride aqueous solution with mass fraction of 3.5%. When the single cell is discharged at constant current of 1 mA/cm$^2$, the discharge voltage curve of the single cell is recorded, as shown in FIG. 10. After discharge for about 30 days, the single cell B reacts to the middle position; the wrapped water-soluble film is dissolved; the solid acidic material is exposed; the environment of the single cell is acidic for a short time; the transitional housing on the surface of the single cell A is dissolved; the anode A is exposed; the single cell is discharged continuously; the voltage is increased; and the continuous discharge time of the single cell exceeds 70 days.

Embodiment 4

Figure 9:
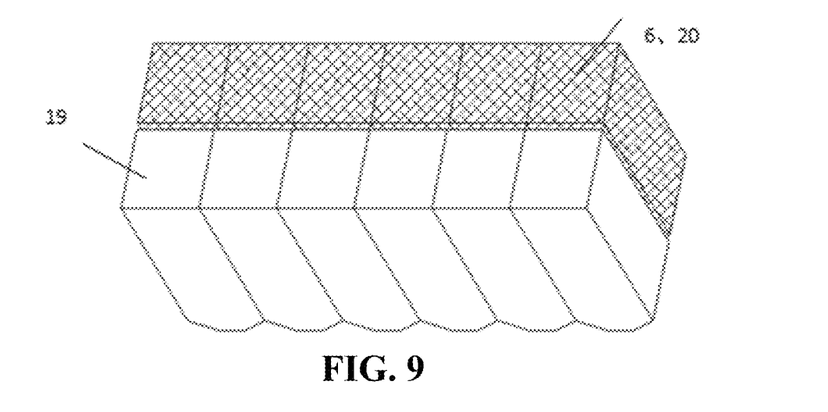
FIG. 9 is a structural schematic diagram of a battery pack of another metal seawater fuel cell.
Figure 11:
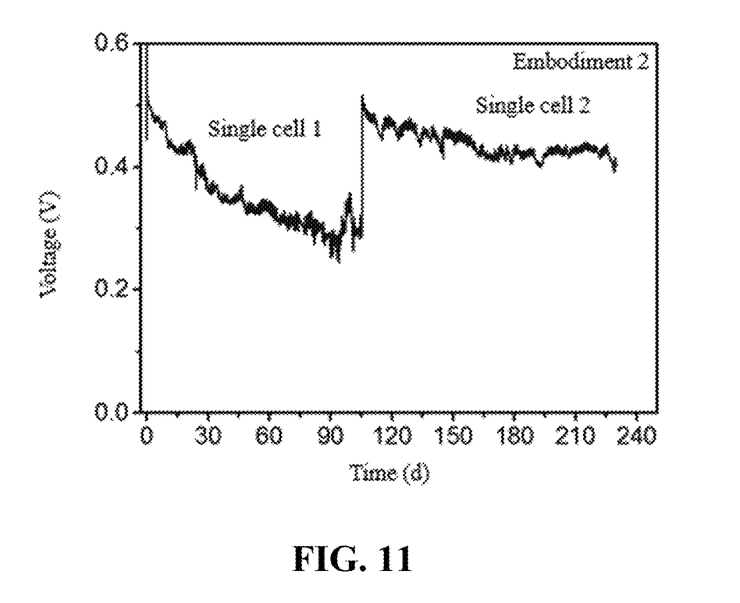
FIG. 11 is a discharge voltage curve of a single cell in embodiment 4.

The battery pack comprises a single cell C 19 and a single cell D 20. Each single cell is composed of a cathode 1, a diaphragm 2 and an anode 3. AZ91 magnesium alloy is used as the anode 3; electrode size is 40 mm*40 mm*40 mm; foamed nickel is used as the cathode 1; cathode size is 40 mm*40 mm*2 mm; a distance between the anode and the cathode is 3 mm; the diaphragm 3 is a polypropylene film arranged between the cathode and the anode; the surface of the single cell B is wrapped with a transitional housing 6; and the transitional housing adopts a water-degradable material prepared by the formula of embodiment 1 in the Chinese invention patent application 201611161196.8, and has a wall thickness of 2 mm. The used electrolyte is a sodium chloride aqueous solution with a mass fraction of 3.5%. When the single cell is discharged at constant current of 1 mA/cm$^2$, the discharge voltage curve of the single cell is recorded, as shown in FIG. 11. After discharge for about 100 days, the transitional housing on the surface of the single cell B is dissolved; the single cell B is gradually exposed; electrolyte enters the single cell; the single cell B begins to be discharged; and the battery pack is discharged continuously for a total of 240 days.

The invention claimed is:

1. A metal seawater fuel cell, comprising: a single cell two or more single cells that are serially or parallelly connected electrically,
   each single cell comprises a single cell housing that houses a metal anode, a cathode carrying a hydrogen evolution catalyst, and a diaphragm arranged between the metal anode and the cathode, a transition housing, and a driving device,
   wherein a bottom and at a top of the single cell housing are respectively provided with fluid flow channels for fluid communication between an interior and an exterior of the single cell housing,
   wherein the transitional housing encases the single cell housing or encases the metal anode inside the single cell housing, and
   wherein the driving device is connected with the transitional housing and is configured to damage the transitional housing when activated.

2. The metal seawater fuel cell according to claim 1, wherein the driving device is activated by a control device to peel off a part of the transitional housing or to cut open the transitional housing using a cutting device.

3. The metal seawater fuel cell according to claim 2, wherein the transitional housing is made of thin layer material or elastic material.

4. The metal seawater fuel cell according to claim 2, wherein the driving device is a motor coupled to a transmission device that is in transmission connection with the driving device,
   wherein the transmission device comprises of one or more rolling screw, or a gear driven drum, or a rope, or a hydraulic cylinder, or a connecting rod mechanism connected in series, and the cutting device is a sharp-edged cutter abutted against the transitional housing; and the control device is in signal connection with the driving device.

5. The metal seawater fuel cell according to claim 2, wherein the control device is a timing control device comprising a clock chip and an auxiliary drive circuit, or a mechanical change control device comprising a force sensing element and a driving circuit, or a capacity control device comprising a voltage and current test element and a driving circuit, or a power change control device comprising a voltage and current test element and a driving circuit, or a battery pack failure control device comprising a voltage and current test element and a driving circuit.

6. The metal seawater fuel cell according to claim 4, wherein the cutting device comprises a cutter arranged on the transmission device, and translates, rotates or flips along with the transmission device to drive the sharp-edged cutter to damage the transitional housing,
   after the activation of the driving device, the single cell is activated to realize the external discharge of the single cell; or a certain single cell in the battery pack or more than two single cells connected in series or in parallel or in series and parallel are activated to realize the rated external discharge of the battery pack.

7. The metal seawater fuel cell according to claim 2, wherein the transitional housing is made of a thin layer material with an internal spiral spring, or elastic rubber, or elastic plastic, or waterproof cloth;
when the thin layer material with the internal spring is used, after the transitional housing is punctured or scratched and a force point at one end of the spring is destroyed, the transitional housing is peeled off from the exterior of the metal anode or the single cell due to spring return, or
when the elastic material is used, after the transitional housing is punctured or scratched, the elastic material is peeled off from the exterior of the metal anode or the single cell due to the effect of elastic force.

8. The metal seawater fuel cell according to claim 1, wherein, when the metal anode or the single cell housing is wrapped, the transitional housing is fixed outside the metal anode or the single cell housing by one or more than one of injection molding, bundling, bonding or welding.

9. The metal seawater fuel cell according to claim 4, wherein detachable plugs or valves are arranged at the openings of the fluid flow channels communicated with the exterior.

10. The metal seawater fuel cell according to claim 9, wherein the driving device is connected with the detachable plugs or valves through the transmission device, and controls the detachment of the detachable plugs at the openings of the fluid flow channels or the opening of the valves.

11. The metal seawater fuel cell according to claim 9, wherein the detachable plugs are arranged in the fluid flow channels at the bottom and the top of the single cell housing, moves with the transmission device and separates from the fluid flow channels at the bottom and the top of the single cell housing.

12. The metal seawater fuel cell according to claim 2, wherein the driving device is a structural driving starting device.

13. The metal seawater fuel cell according to claim 12, wherein the structural driving starting device comprises a lever adjusting displacement mechanism and Hall the cutting device; when a single cell reacts completely, the weight change of the single cell drives the displacement mechanism to generate displacement, then drives the cutting device to damage the transitional housing, and thereby activates the other one or more single cells in the battery pack.

14. The metal seawater fuel cell according to claim 2, wherein, when the control device is a mechanical change control device with a force sensing element and a driving circuit, the single cell is an open structure with a product storage cavity at the bottom.

15. The metal seawater fuel cell according to claim 1, wherein the transitional housing is made of a seawater-degradable material and/or a biodegradable material.

16. The metal seawater fuel cell according to claim 15, wherein the seawater-degradable material is prepared by mixing aliphatic polyester, a hydrolysis inhibitor and/or a hydrolysis accelerator, and an auxiliary agent; and
the biodegradable material is a fully biodegradable plastic and/or a destructive biodegradable plastic.

17. The metal seawater fuel cell according to claim 16, wherein the destructive biodegradable plastic is one or more than one of starch-modified or filled polyethylene PE, polypropylene PP, polyvinyl chloride PVC and polystyrene PS; and the fully biodegradable plastic is one or more than one of thermoplastic starch plastic, aliphatic polyester, polylactic acid, and starch/polyvinyl alcohol.

18. The metal seawater fuel cell according to claim 15, characterized in that: in the closed single cell housing, two metal anodes are arranged on two opposite sides of the cathode carrying the hydrogen evolution catalyst; an acidic material or an alkaline material sealed and wrapped by a water-soluble film and/or a film of the seawater-degradable material is arranged in one of the metal anodes; the other metal anode is wrapped by a to-be-degraded housing (as the transitional housing) corresponding to the sealed and wrapped acidic material or alkaline material; and the acidic material or the alkaline material wrapped by the water-soluble film or the film of the seawater-degradable material is sealed and stored in the transitional housing of one of the metal anodes.

19. The metal seawater fuel cell according to claim 18, wherein the material of the to-be-degraded housing is one or more than one of aluminum hydroxide, zinc hydroxide, calcium hydroxide, magnesium hydroxide, iron hydroxide, calcium oxide, magnesium oxide, zinc oxide, aluminum oxide, ferric oxide and nickel oxide; or one or more than one of calcium carbonate, barium carbonate, silver carbonate, zinc oxide and aluminum oxide; and
the acidic material is a solid acid that is one or a mixture of more than one of silicic acid, trichloroacetic acid, periodic acid, dinitrobenzoic acid and ethylenediaminetetraacetic acid.

20. The metal seawater fuel cell according to claim 18, wherein the water-soluble film is a natural water-soluble polymer or a chemically modified natural polymer or a synthetic polymer; and the seawater-degradable material is a fully biodegradable plastic and/or a destructive biodegradable plastic.

21. The metal seawater fuel cell according to claim 20, wherein the natural water-soluble polymer is one or more than one of starch, cellulose, vegetable glue and animal glue;
the chemically modified natural polymer is one or more than one of carboxymethyl starch, acetate starch, hydroxymethyl cellulose and carboxymethyl cellulose; and
the synthetic polymer is one or more than one of polyacrylamide (PAM), hydrolyzed polyacrylamide (HPAM) and polyvinylpyrrolidone (PVP).

22. The metal seawater fuel cell according to claim 1, wherein the metal seawater fuel single cell is an open structure with the product storage cavity at the bottom; and the product discharge hole is arranged at the bottom of the product storage cavity.

23. The metal seawater fuel cell according to claim 22, when wherein the metal seawater cell comprises more than two single cells connected in series or in parallel or in series and parallel, and the bottoms of the product storage cavities of the single cells are product discharge holes, flow channels are arranged among the single cells and a length-to-diameter ratio of the flow channels is greater than 1.

24. The metal seawater fuel cell according to claim 15, wherein the material of the single cell housing is one or more than one of ABS plastic, polyvinyl chloride PVC, high-density polyethylene HDPE, polypropylene PP, polystyrene/modified polystyrene PS, polyoxymethylene POM, polyphenylene oxide PPO, polyimide PI, polyphenylene sulfide PPS, ethylene PE, nylon PA and polysulfone PSF.

* * * * *